(12) United States Patent  
Sun et al.

(10) Patent No.: US 12,501,485 B2  
(45) Date of Patent: Dec. 16, 2025

(54) DISCOVERY REFERENCE SIGNAL MULTIPLEXING WITH NON-UNICAST TRANSMISSION IN A SHARED SPECTRUM

(71) Applicant: QUALCOMM Incorporated, San Diego, CA (US)

(72) Inventors: Jing Sun, San Diego, CA (US); Vinay Chande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 18/052,181

(22) Filed: Nov. 2, 2022

(65) Prior Publication Data

US 2023/0262761 A1 Aug. 17, 2023

Related U.S. Application Data

(60) Provisional application No. 63/267,920, filed on Feb. 11, 2022, provisional application No. 63/268,196, filed on Feb. 17, 2022.

(51) Int. Cl.
*H04W 74/0808* (2024.01)
*H04L 5/00* (2006.01)
*H04W 72/044* (2023.01)
*H04W 56/00* (2009.01)

(52) U.S. Cl.
CPC ......... *H04W 74/0808* (2013.01); *H04L 5/005* (2013.01); *H04W 72/046* (2013.01); *H04W 56/001* (2013.01)

(58) Field of Classification Search
CPC ........... H04W 74/0808; H04W 72/046; H04W 56/001; H04L 5/005; H04L 5/0044; H04L 5/0053; H04L 5/0048
USPC ................................ 370/281, 445, 329, 328
See application file for complete search history.

(56) References Cited

U.S. PATENT DOCUMENTS

| | | | |
|---|---|---|---|
| 2020/0351847 A1* | 11/2020 | Kim ...................... H04L 5/0094 |
| 2021/0007085 A1* | 1/2021 | Lin ....................... H04L 5/0053 |
| 2021/0058949 A1* | 2/2021 | Kim .................. H04W 72/1268 |
| 2021/0092763 A1* | 3/2021 | Li ....................... H04W 72/569 |
| 2022/0240313 A1* | 7/2022 | Lin ....................... H04L 5/0057 |
| 2022/0346128 A1* | 10/2022 | Ko ............................. H04L 1/00 |
| 2023/0041667 A1* | 2/2023 | Lunttila ............ H04W 74/0808 |
| 2024/0023041 A1* | 1/2024 | Wang ................ H04W 56/0015 |

* cited by examiner

*Primary Examiner* — Ricardo H Castaneyra
(74) *Attorney, Agent, or Firm* — Procopio, Cory, Hargreaves & Savitch LLP

(57) ABSTRACT

A network entity multiplexes a non-unicast transmission with a discovery burst in one or more slots within the discovery burst based on a distance from a slot that includes a discovery reference signal (DRS) and outputs for transmission a multiplexed discovery burst including the non-unicast transmission in a shared spectrum based on a listen before talk (LBT) relaxation.

30 Claims, 11 Drawing Sheets

DISCOVERY REFERENCE SIGNAL MULTIPLEXING WITH NON-UNICAST TRANSMISSION IN A SHARED SPECTRUM

CROSS REFERENCE TO RELATED APPLICATION(S)

This application claims the benefit of and priority to U.S. Provisional Application Ser. No. 63/267,920, entitled "Discovery Reference Signal Multiplexing with Non-Unicast Transmission in a Shared Spectrum" and filed on Feb. 11, 2022, and U.S. Provisional Application Ser. No. 63/268,196, entitled "Discovery Reference Signal Multiplexing with Non-Unicast Transmission in a Shared Spectrum" and filed on Feb. 17, 2022, which are expressly incorporated by reference herein in their entirety.

TECHNICAL FIELD

The present disclosure relates generally to communication systems, and more particularly, to wireless communication including multiplexing of downlink transmissions including a discovery reference signal (DRS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a network entity. The apparatus multiplexes a non-unicast transmission with a discovery burst in one or more slots within the discovery burst based on a distance from a slot that includes a discovery reference signal (DRS) and outputs for transmission a multiplexed discovery burst including the non-unicast transmission in a shared spectrum based on a listen before talk (LBT) relaxation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
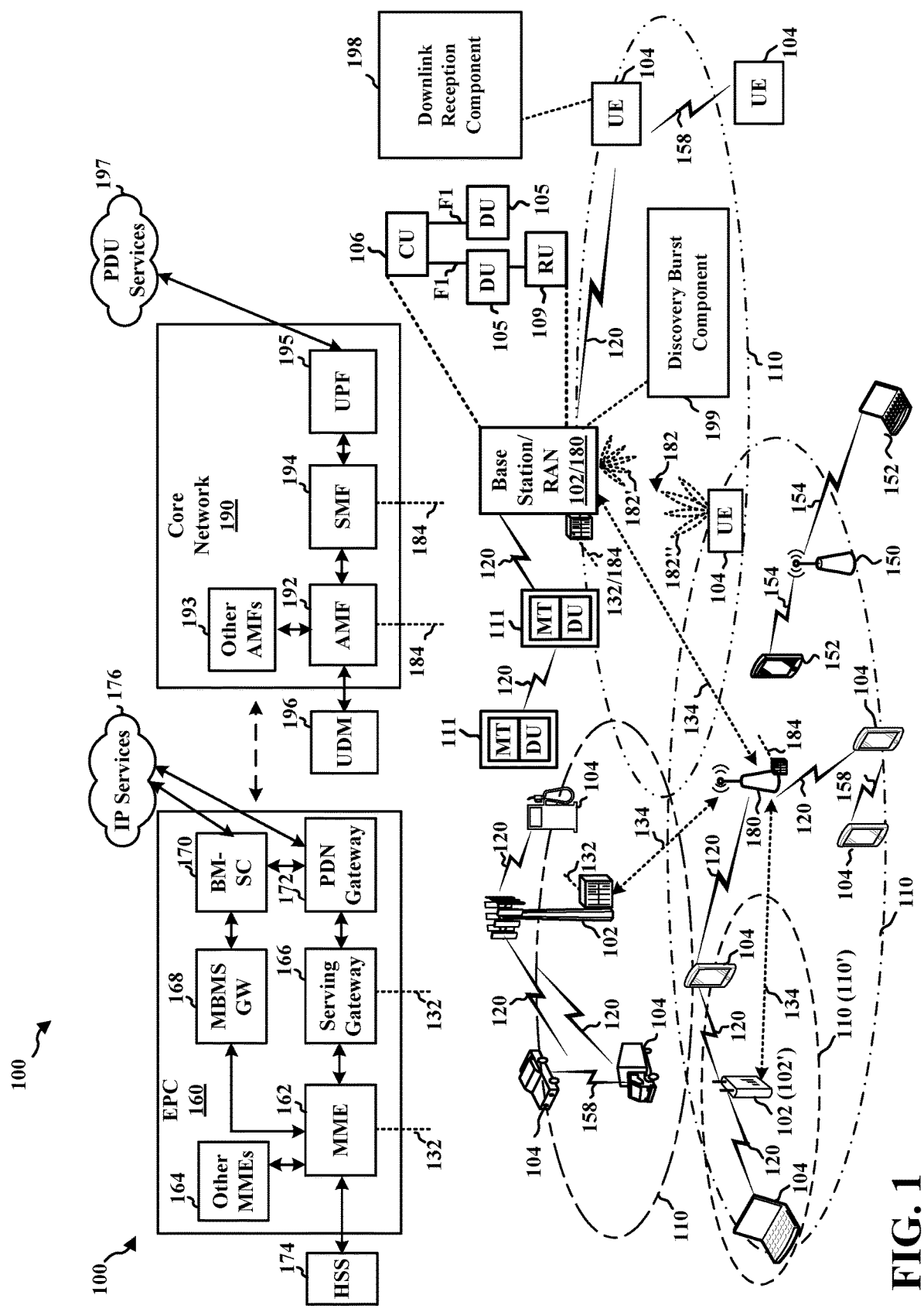
FIG. 1 is a diagram illustrating an example of a wireless communications system and an access network, in accordance with various aspects of the present disclosure.

In a shared spectrum, a transmitter may perform sensing, such as a listen before talk (LBT) procedure before transmitting within the shared spectrum. In some aspects, some signals may be transmitted with a relaxation of the LBT procedure, e.g., such as without the LBT procedure. As an example, one or more discovery reference signals (DRS) such as one or more of a synchronization signal block (SSB), a remaining system information (RMSI) physical downlink control channel (PDCCH), an RMSI physical downlink shared channel (PDSCH), or a non-zero power channel state information reference signal (NZP-CSI-RS) may be transmitted in the shared spectrum using a relaxed LBT procedure. For example, a network entity may transmit the SSB, RMSI PDCCH, RMSI PDSCH, and/or NZP-CSI-RS without an LBT procedure before transmitting a discovery burst. In another example, the network entity may transmit the SSB, RMSI PDCCH, RMSI PDSCH, and/or NZP-CSI-RS after performing a category 2 (Cat 2) LBT procedure in place of a category 4 (Cat 4) LBT procedure or category 3 (Cat 3) LBT procedure. A discovery burst may include additional resources in time and/or frequency that are not used for the DRS. In some aspects, the network entity may multiplex other non-unicast transmissions with the DRS in the DRS burst. As an example, the other non-unicast transmissions may include a broadcast PDSCH, a PDSCH without user-plane data, a PDCCH, or a positioning reference signal (PRS). Aspects presented herein provide mechanisms that help to balance the use of resources in the shared spectrum while also allowing for LBT relaxation for some signals.

In some aspects, the non-unicast transmission may be multiplexed with the DRS in the one or more slots of the discovery burst that include an SSB and not in slots of the discovery burst that do not include the SSB. In some aspects, the non-unicast transmission may be multiplexed with the DRS in the one or more slots that are within a particular number of slots from the one or more slots including the SSB and not in the slots of the discovery burst that are more than the particular number of slots from the one or more slots including the SSB.

In some aspects, the non-unicast transmission may be multiplexed with the DRS in the one or more slots that include at least one of an SSB, an RMSI PDCCH, an RMSI PDSCH, or an NZP-CSI-RS and not in slots of the discovery burst that do not include the SSB, the RMSI PDCCH, the RMSI PDSCH, or the NZP-CSI-RS. In some aspects, the non-unicast transmission may be multiplexed with the DRS in the one or more slots that are within a particular number of slots from the one or more slots including the SSB, the RMSI PDCCH, the RMSI PDSCH, or the NZP-CSI-RS and not in slots of the discovery burst that are more than the number of slots from the one or more slots including the SSB, the RMSI PDCCH, the RMSI PDSCH, or the NZP-CSI-RS.

The aspects presented herein may provide for improved fairness in wireless communication in a shared spectrum.

The detailed description set forth below in connection with the drawings describes various configurations and does not represent the only configurations in which the concepts described herein may be practiced. The detailed description includes specific details for providing a thorough understanding of various concepts. However, these concepts may be practiced without these specific details. In some instances, well known structures and components are shown in block diagram form to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and/or another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In another deployment example, the base station may also be configured to support 4G LTE or other access technology at the same time. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). In another example, the base stations may also support Non-Public Network (NPN), in the form of either stand-alone Non-Public Network (SNPN) or Public Network Integrated NPN (PNI-NPN). Access to the base stations may be controlled with Closed Access Group (CAG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

Some examples of sidelink communication may include vehicle-based communication devices that can communicate in the form of vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), and/or a combination thereof and/or with other devices, which can be collectively referred to as vehicle-to-anything (V2X) communications. Sidelink communication may be based on V2X or other D2D communication, such as Proximity-based Services (ProSe), etc. In addition to UEs, sidelink communication may also be transmitted and received by other transmitting and receiving devices, such as Road Side Unit (RSU) 107, etc. Sidelink communication may be exchanged using a PC5 interface.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user plane PDU session packets, e.g. IP, Ethernet, or unstructured packets, are transferred through the UPF 195. The UPF 195 may provide UE IP address allocation as well as other functions. The UPF 195 is connected to the PDU Services 197. The PDU Services 197 may include the Internet, an intranet, an IP Multimedia Subsystem (IMS), a Packet Switch (PS) Streaming (PSS) Service, and/or other IP or non-IP based services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network. Connections between these devices may be Wi-Fi, Bluetooth, Sidelink, or other D2D communication technologies.

Referring again to FIG. 1, in certain aspects, a network entity, such as a base station 102/180, or a component of a base station such as a CU 106, DU 105 and/or RU 109, may include a discovery burst component 199 configured to multiplex a non-unicast transmission with a discovery burst in one or more slots within the discovery burst based on a distance from a slot that includes a DRS and output for transmission a multiplexed discovery burst including the non-unicast transmission in a shared spectrum based on an LBT relaxation, in accordance with the aspects presented herein. In some aspects, a receiver, such as a UE 104 may include a downlink reception component 198 configured to receive a multiplexed transmission that includes a non-unicast transmission multiplexed with a discovery burst in one or more slots within the discovery burst that include a DRS, in accordance with the aspects presented herein. Although the following description may be focused on 5G NR, the concepts described herein may be applicable to other similar areas, such as LTE, LTE-A, CDMA, GSM, and other wireless technologies.

Figure 2:
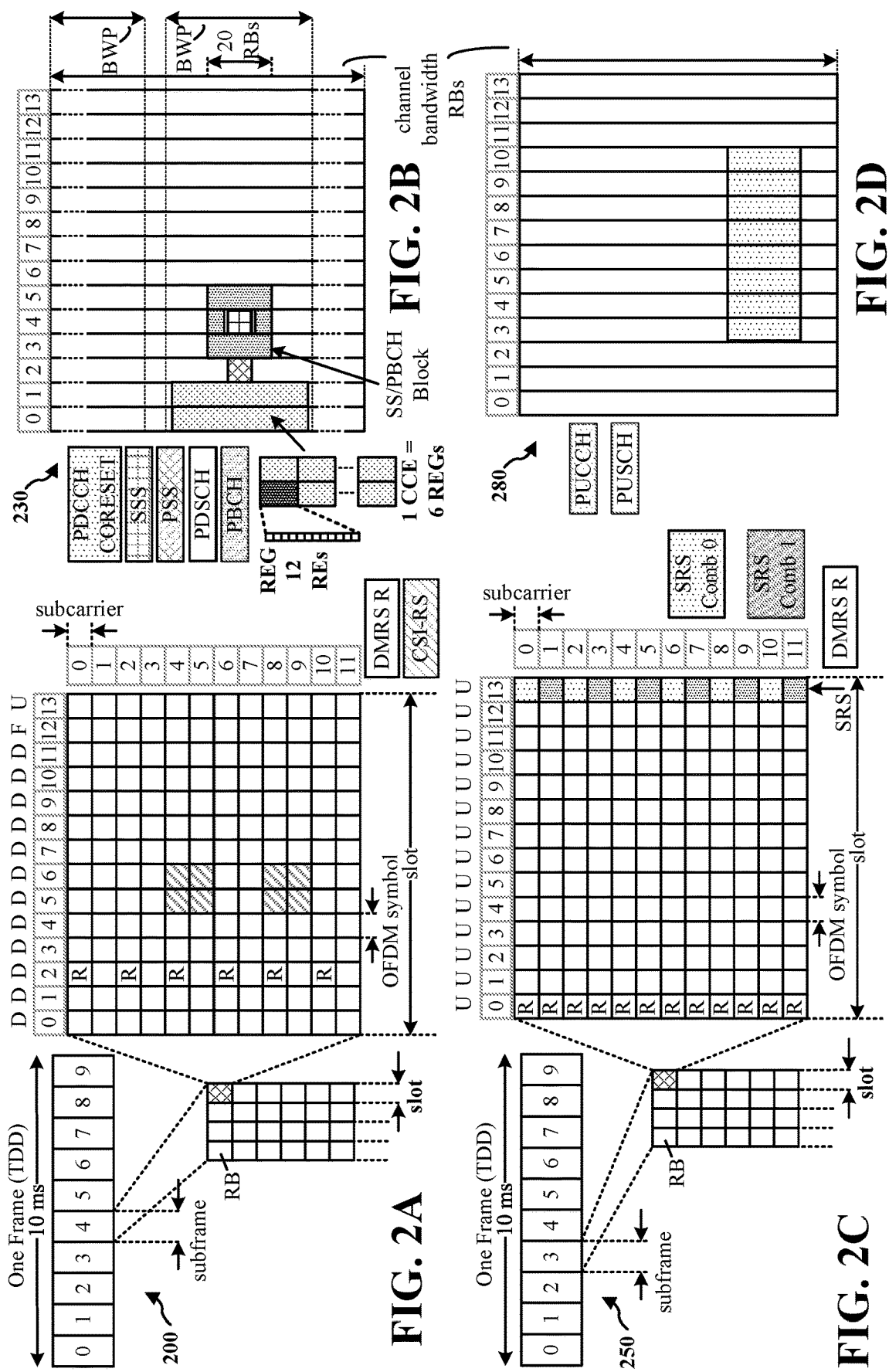
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu 0$ to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu *15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
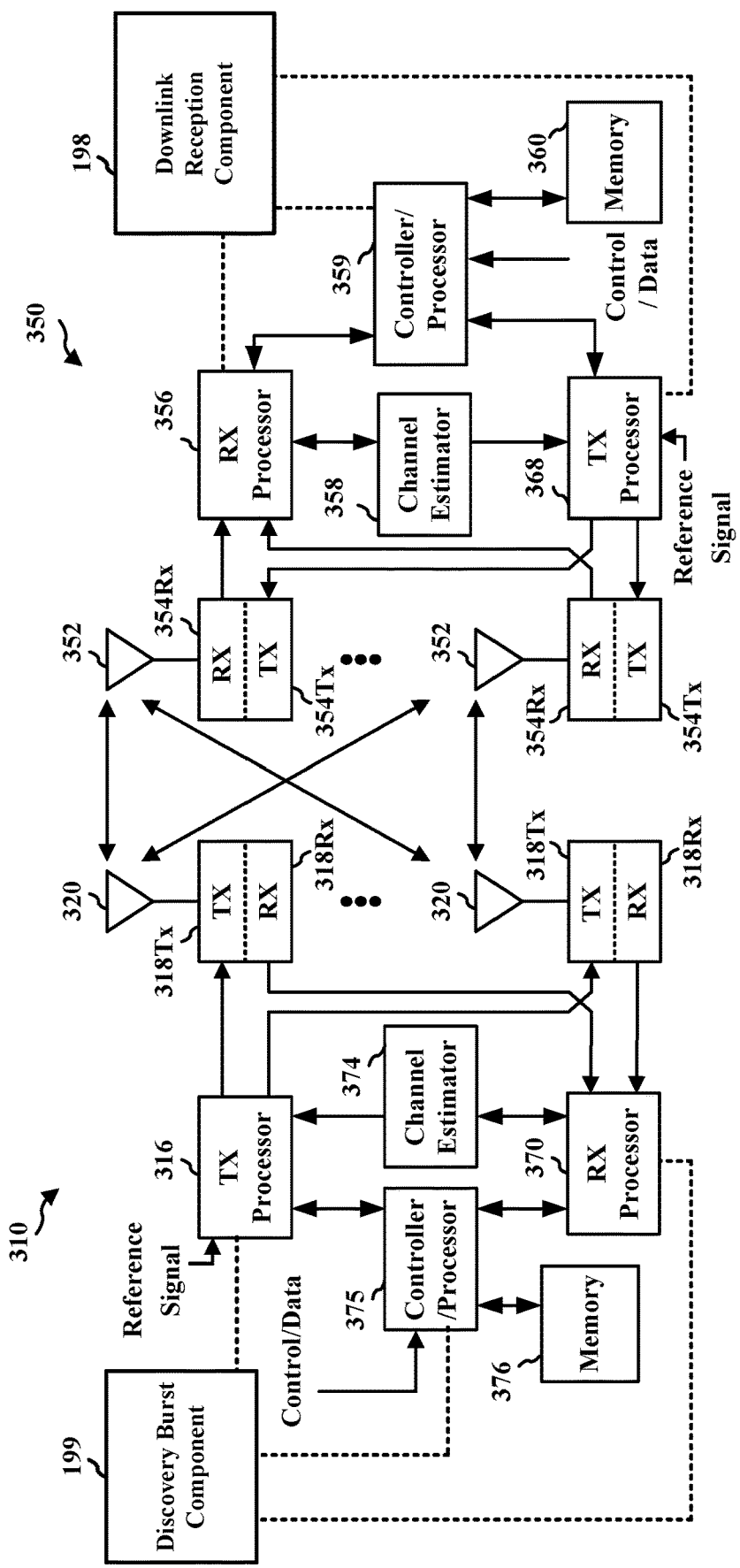
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a RRC layer, and layer 2 includes a SDAP layer, a PDCP layer, an RLC layer, and a MAC layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the downlink reception component 198 of FIG. 1.

At least one of the TX processor 316, the RX processor 370, and the controller/processor 375 may be configured to perform aspects in connection with the discovery burst component 199 of FIG. 1.

Deployments of communication systems, such as 5G new radio (NR) systems, may be arranged in multiple manners with various components or constituent parts. In a 5G NR system, or network, a network node, a network entity, a mobility element of a network, a RAN node, a core network node, a network element, or a network equipment, such as a base station (BS), or one or more units (or one or more components) performing base station functionality, may be implemented in an aggregated or disaggregated architecture. For example, a BS (such as a Node B (NB), eNB, NR BS, 5G NB, AP, a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
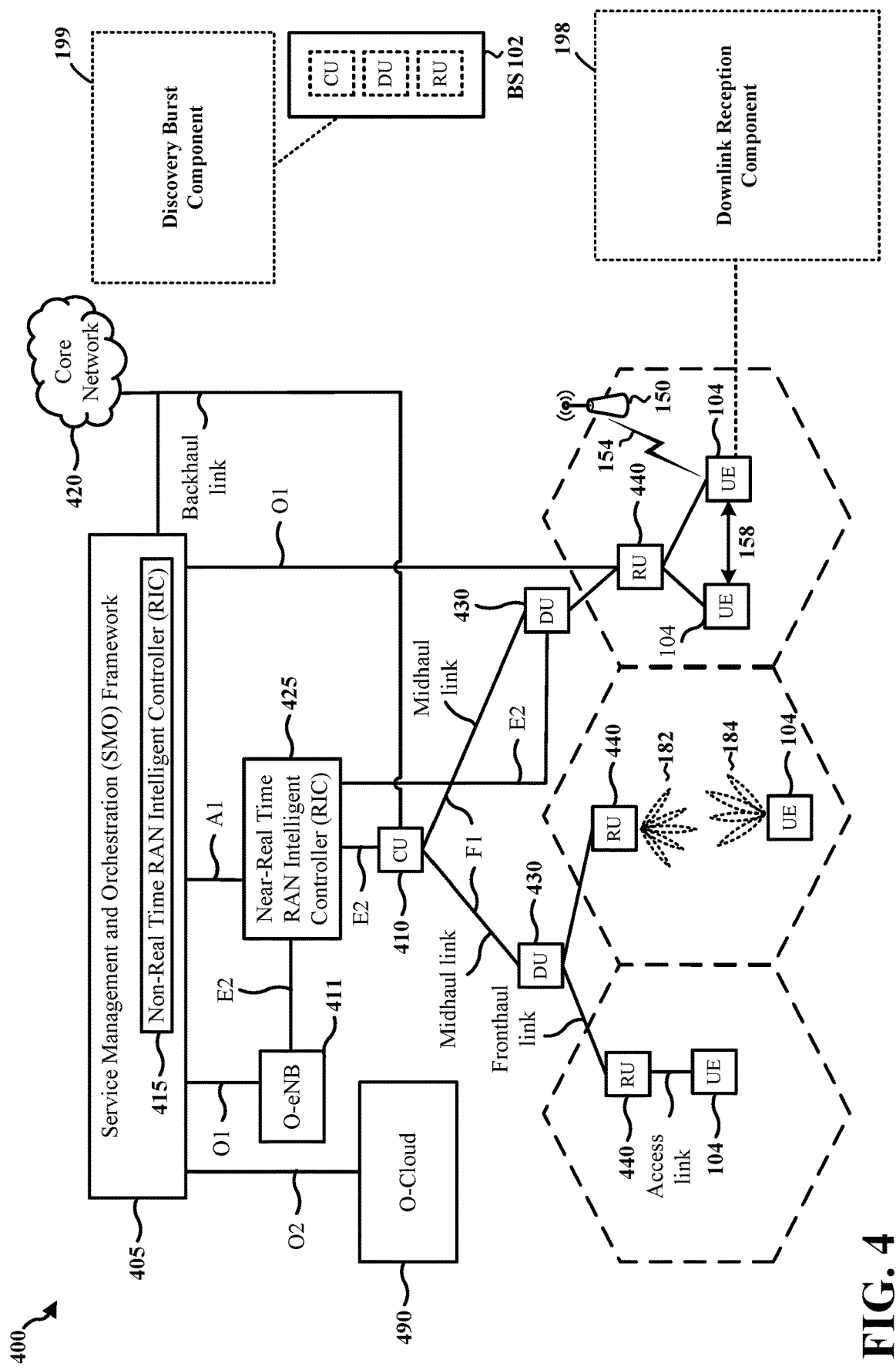
FIG. 4 is a diagram illustrating an example disaggregated base station, in accordance with various aspects of the present disclosure.

FIG. 4 shows a diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more RUs 440 via respective fronthaul links. The RUs 440 may communicate with respective UEs 104 via one or more RF access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 410 may host one or more higher layer control functions. Such control functions can include RRC, PDCP, SDAP, or the like. Each control function can be implemented with an interface configured to communicate signals with other control functions hosted by the CU 410.

The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

In a shared spectrum, a transmitter may perform sensing, such as an LBT procedure before transmitting within the shared spectrum. The LBT procedure may include a sensing procedure to monitor for other signals on the channel. If the LBT procedure is successful and indicates that the channel is available, the transmitter may proceed with transmitting a transmission on the channel. If the LBT procedure is not successful and indicates that the channel is busy, the transmitter may not transmit on the channel. In some aspects, one or more discovery reference signals (DRS) such as one or more of an SSB, an RMSI PDCCH, an RMSI PDSCH, or an NZP-CSI-RS may be transmitted in the shared spectrum using a relaxed LBT procedure. For example, a network entity may transmit the SSB, RMSI PDCCH, RMSI PDSCH, and/or NZP-CSI-RS without an LBT procedure before transmitting a discovery burst. A discovery burst may refer to a downlink transmission burst including a set of signal(s) and/or channel(s) confined within a window and associated with a duty cycle. As an example, a discovery burst may be transmissions initiated by a base station that includes a PSS, SSS, and cell-specific reference signal(s) (CRS) and may include non-zero power CSI-RS. As another example, a discovery burst may be transmissions initiated by a base station that includes at least an SS/PBCH block comprising a PSS, SSS, PBCH with associated DM-RS and may also include CORESET for PDCCH scheduling PDSCH with SIB1, and PDSCH carrying SIB 1 and/or non-zero power CSI CSI-RS. As an example, in FR2-2 (60 GHz band) shared spectrum, a transmission of DRS (e.g., SSB, RMSI PDCCH, and RMSI PDSCH, and NZP-CSI-RS) may be based on a short control signaling clause or provision that allows transmission of the DRS without an LBT. The short control signaling clause may allow a device to transmit control signaling transmissions in a shared spectrum without an LBT procedure, in some aspects. The DRS may provide system information that allows devices to discover the network, e.g., which may be referred to as critical system information in some aspects. In some aspects, the transmission without an LBT procedure may be based on a duty cycle limitation, e.g., that allows the transmission of the DRS without the LBT procedure for no more than a threshold percentage in a time period. As an example of a duty cycle limitation, DRS may be transmitted without an LBT up to (e.g., with no more than) a 10% duty cycle in any 100 ms duration. For example, a network entity such as a base station may transmit a discovery burst that spans 10 ms in any 100 ms duration without performing LBT for the FR2-2 shared spectrum. The base station may avoid transmitting additional DRS within the 100 ms duration or may first perform an LBT for the FR2-2 shared spectrum in order to transmit an additional DRS within the 100 ms duration.

In another example, the network entity may transmit the SSB, the RMSI PDCCH, the RMSI PDSCH, and/or the NZP-CSI-RS after performing a different category LBT, such as after performing category 2 (Cat 2) LBT procedure in place of a category 4 (Cat 4) LBT procedure or category 3 (Cat 3) LBT procedure. A discovery burst may include additional resources in time and/or frequency that are not used for the DRS. In some aspects, the network entity may multiplex other non-unicast transmissions with the DRS in the DRS burst. As an example, the other non-unicast transmissions may include a broadcast PDSCH, a PDSCH without user-plane data, a PDCCH, or a PRS. The non-unicast transmissions may be multiplexed with the DRS in the same transmission burst, e.g., discovery burst, following a DRS transmission channel access rule that allows for an LBT relaxation. There may be different categories of LBT procedures, including category 1 LBT (e.g., no LBT), Cat 2 LBT (e.g., LBT including one-time channel sensing for a fixed period without a back-off period), category 3 LBT (e.g., LBT with a random (or other) back-off period and a fixed sized contention window), and Cat 4 LBT (e.g., LBT with a random (or other) back-off period and a variable sized contention window). In some cases, a Cat 2 LBT procedure may be referred to as a one-time LBT procedure where a UE may perform channel sensing for a particular duration of time. Further, a Cat 4 LBT procedure may be referred to as a fairness-based LBT procedure for performing channel sensing with a backoff, where the backoff may be used to prevent a UE from accessing a channel immediately after detecting that the channel is clear. The LBT relaxation may include the use of no LBT or a Cat 2 LBT rather than a Cat 3 LBT or Cat 4 LBT. As indicated, the Cat 2 LBT may involve a single shot and a shorter sensing duration, whereas a Cat 3 LBT and Cat 4 LBT may include a longer sensing duration. The use of the Cat 2 LBT in place of a Cat 3 LBT or Cat 4 LBT corresponds to a relaxation of the LBT.

Multiplexing the non-unicast transmissions with the DRS enables the transmission of such control signaling along with the DRS. The non-unicast transmission includes broadcast signaling, rather than signaling directed to a single UE. Even if not transmitted with the DRS, the non-unicast transmissions may need to be transmitted in a different channel occupancy time (COT). For example, the non-unicast transmission may include system information, control messaging, such as SIBs beyond SIB1, paging signaling, etc. By combining the non-unicast transmission with the DRS transmission enables a more efficient use of the (COT) of the discovery burst that includes the DRS transmission. When the DRS is transmitted, there may be holes, or unused resources in the time domain and/or the frequency domain over the COT, with the DRS transmission. Multiplexing the non-unicast transmission helps to improve the efficient use of the resources by filling the unused resources associated with the COT rather than initiating another COT that would occupy more over-the-air resources to transmit the non-unicast transmission.

Aspects presented herein provide mechanisms that help to balance the use of resources in the shared spectrum and allow for a fair occupancy of the air link resources by other nodes in the shared spectrum wireless environment. Aspects presented herein balance the use of over-the-air resources due to the larger transmission with the efficient transmission of non-unicast data and the efficient use of a COT for the DRS.

Figure 5:
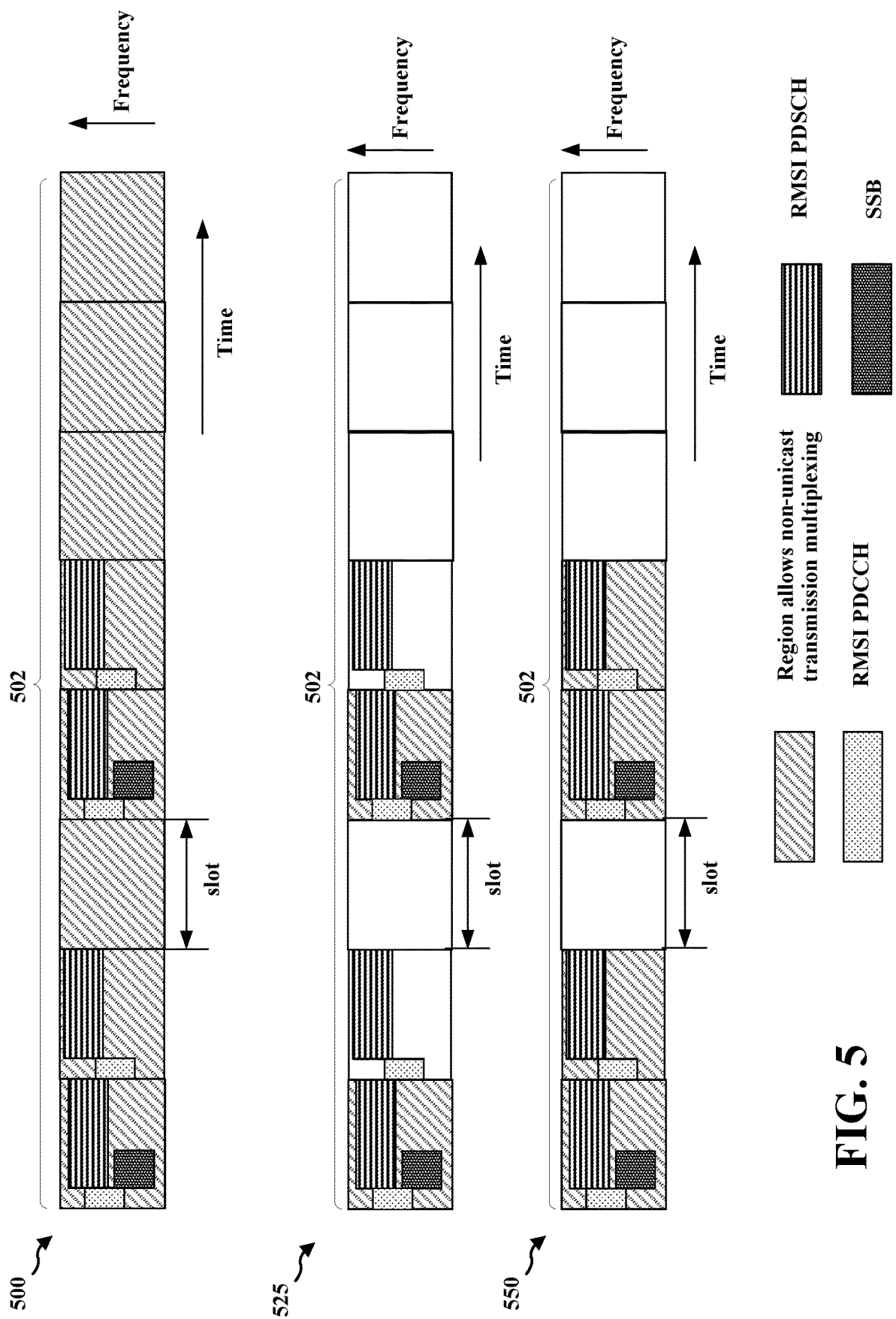
FIG. 5 is a resource diagram showing example aspects of a non-unicast transmission multiplexed in a discovery burst, in accordance with various aspects of the present disclosure.

FIG. 5 illustrates an example 500 resource diagram showing a region within a discovery burst 502, which may also be referred to as a DRS burst, that may be used for multiplexing non-unicast transmissions (e.g., a broadcast PDSCH, a PDSCH without user-plane data, a PDCCH, and/or a PRS) with the DRS (e.g., SSB, RMSI PDCCH, and RMSI PDSCH, and/or NZP-CSI-RS). The multiplexed combination may then be transmitted in a shared spectrum, such as FR2-2 shared spectrum, with a relaxed LBT. In the example 500, the non-unicast transmission may be included throughout the remaining resources of discovery burst 502. The discovery burst 502 may be based on a duty cycle limitation for DRS transmission on the shared spectrum with the relaxed LTB. In the example 500, the discovery burst 502 spans 8 slots. The base station may refrain from transmitting another discovery burst with the relaxed LBT until an amount of time corresponding to 72 slots have passed. The example length of the discovery burst 502 is merely an example. The discovery burst 502 may have any length that stays within the duty cycle for the DRS transmission with the relaxed LBT.

The diagram 525 in FIG. 5 shows an example in which the non-unicast transmission may be multiplexed with the DRS in the one or more slots of the discovery burst 502 that include an SSB and may not be multiplexed in a slot of the discovery burst that does not include the SSB. Thus, the non-unicast transmission is multiplexed in DRS slots that carry the SSBs.

The diagram 550 in FIG. 5 shows an example in which the non-unicast transmission may be multiplexed with the DRS in the one or more slots that include at least one of an SSB, an RMSI PDCCH, an RMSI PDSCH, or an NZP-CSI-RS and may not be multiplexed in a slot of the discovery burst that does not include the SSB, the RMSI PDCCH, the RMSI PDSCH, or the NZP-CSI-RS. Thus, the non-unicast transmission is multiplexed in DRS slots that carry the DRS.

Figure 6:
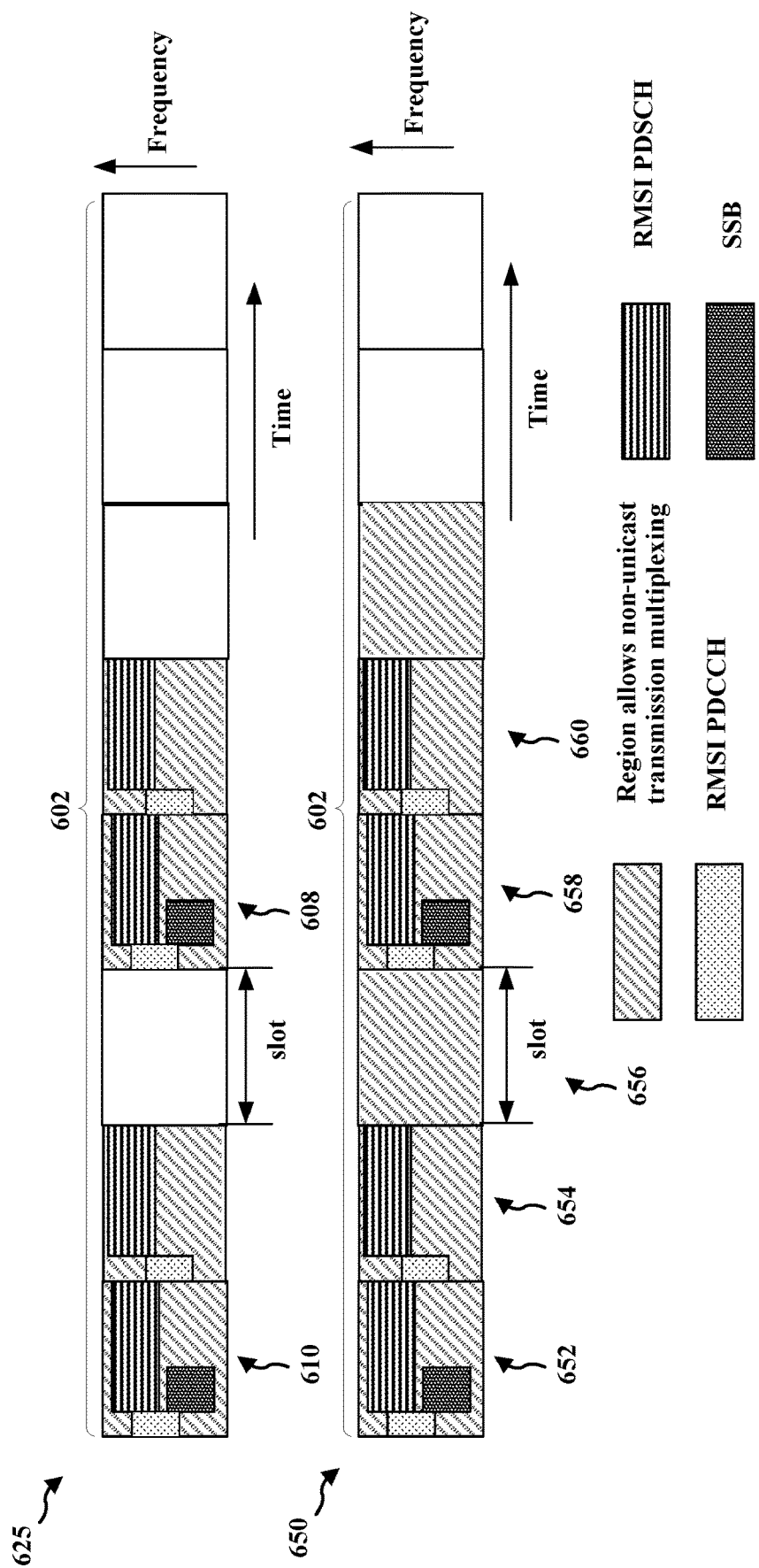
FIG. 6 is a resource diagram showing example aspects of a non-unicast transmission multiplexed in a discovery burst, in accordance with various aspects of the present disclosure.

The diagram 625 in FIG. 6 shows an example in which the non-unicast transmission may be multiplexed with the DRS in slots that are within a particular number of slots from the one or more slots including the SSB (e.g., slots 608 and 610) and may not be multiplexed in a slot of the discovery burst that is more than the number of slots from the one or more slots including the SSB. The number of slots may correspond to a parameter X, such that the non-unicast transmission may be multiplexed in the DRS burst 602 if it is within X slots of the last slot transmitting the SSB. In the example shown in FIG. 6, X=1. This value of X is merely an example, and the parameter X may be 2 or more slots, in other examples. The parameter X may be a known parameter or a defined parameter, such as a parameter indicated in a wireless standard or otherwise known by a network entity. In other examples, the parameter X may be selected by a network, such as a base station choice of the parameter X. In some aspects, the choice may be based on one or more rules for the parameter X.

The example diagram 650 illustrates an example in which the non-unicast transmission may be multiplexed with the DRS in the one or more slots that are within a number of slots from the one or more slots including the SSB (e.g., slots 652 and 658), the RMSI PDCCH (e.g., slots 652, 654, 656, 658, and 660), the RMSI PDSCH (e.g., slots 652, 654, 656, 658, and 660), or the NZP-CSI-RS and may not be multiplexed in a slot of the discovery burst that is more than the number of slots from the one or more slots including the SSB, the RMSI PDCCH, the RMSI PDSCH, or the NZP-CSI-RS. For example, the non-unicast transmission may be multiplexed in the discovery burst, or DRS burst, if it is within X slots of the last slot transmitting the DRS. The example diagram 650 corresponds to X=1 and shows that the non-unicast transmission may be within 1 slot of the last slot transmitting the RMSI PDCCH, the RMSI PDSCH, or the NZP-CSI-RS and not SSB.

The aspects presented herein may provide for improved fairness in wireless communication in a shared spectrum.

Figure 7:
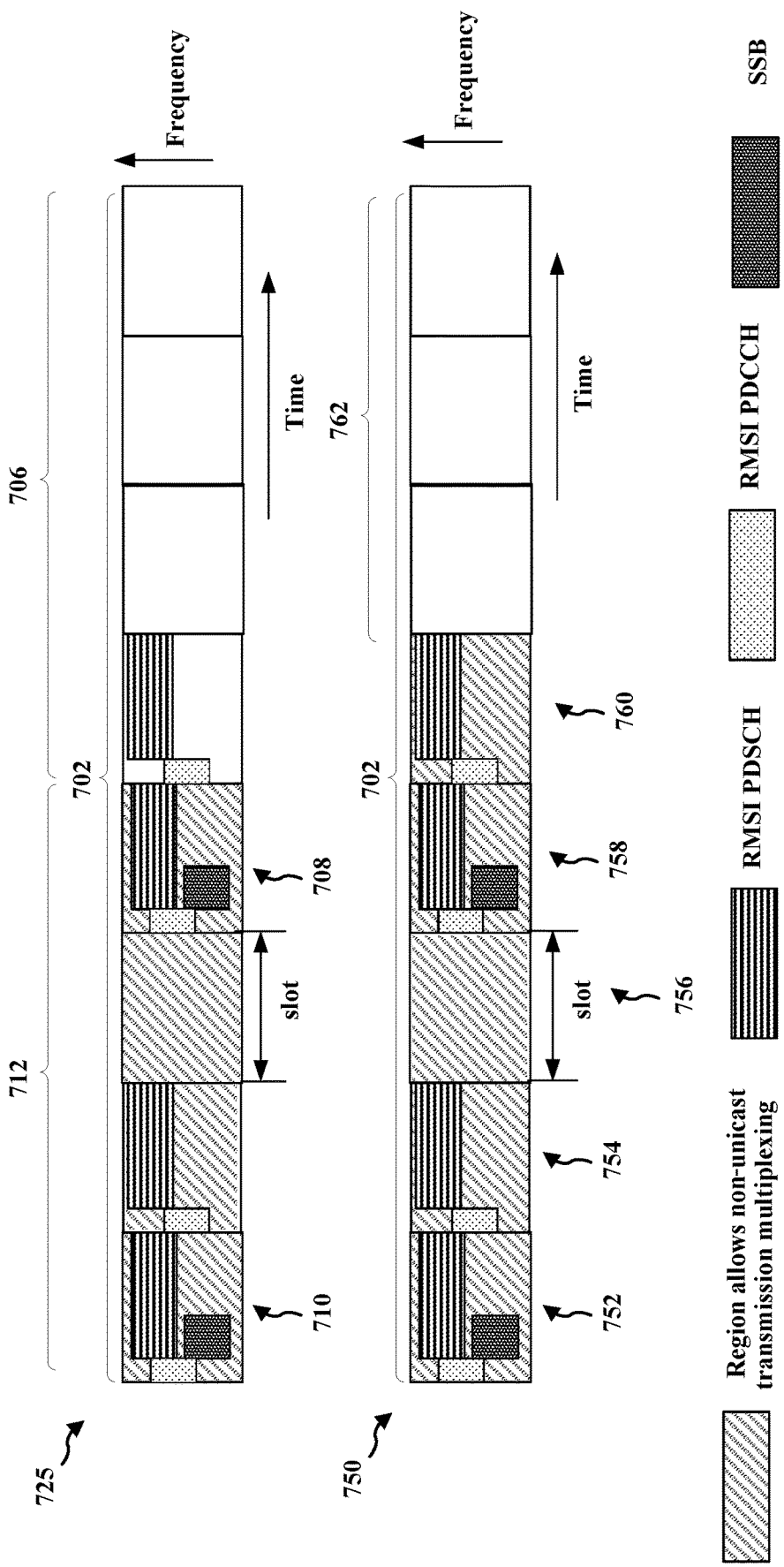
FIG. 7 is a resource diagram showing example aspects of a non-unicast transmission multiplexed in a discovery burst, in accordance with various aspects of the present disclosure.

The diagram 725 in FIG. 7 shows an example in which the non-unicast transmission may be multiplexed with the DRS in slots that include the SSB and between slots that include the SSB. In 725, the non-unicast transmission may not be multiplexed in a slot of the discovery burst that is after a last slot including the SSB, e.g., in the four slots 706 following the last slot including the SSB, e.g., 708. In some aspects, the non-unicast transmission may not be multiplexed in a slot prior to a first slot including the SSB, e.g., slot 710 in the diagram 725. For example, a base station may identify within a DRS burst 702 the first slot including an SSB (e.g., 710) and a last slot including an SSB (e.g., 708), and may allow non-unicast transmission to be multiplexed within the slots (e.g., 712) between the first slot and the last slot that include the SSB, which may include the first and last slot of the DRS burst that include the SSB.

The diagram 750 in FIG. 7 shows an example in which the non-unicast transmission may be multiplexed with the DRS in slots that include a DRS (e.g., slot 752, 754, 758, and 760) and between slots that include a DRS (e.g., slot 756). In 725, the non-unicast transmission may not be multiplexed in a slot of the discovery burst that is after a last slot including the DRS, e.g., slots 762. In some aspects, the non-unicast transmission may not be multiplexed in a slot prior to a first slot including the DRS, e.g., the slot 752. For example, a base station may identify within a DRS burst 702 the first slot including a DRS and a last slot including a DRS, and may allow non-unicast transmission to be multiplexed within the slots between the first slot and the last slot that include the DRS.

The examples described in connection with 725 and 750 allow for a continuous non-unicast transmission to be supported (e.g., with no gap in the DRS burst), in contrast to the examples shown at 525 and 550 in FIG. 5. The examples described in connection with 725 and 750 help to avoid transmitting a DRS burst longer (whether earlier (e.g., prior to 710 or 752) or later (e.g., after 708 or 760)) than what is needed for the DRS transmission.

Figure 8:
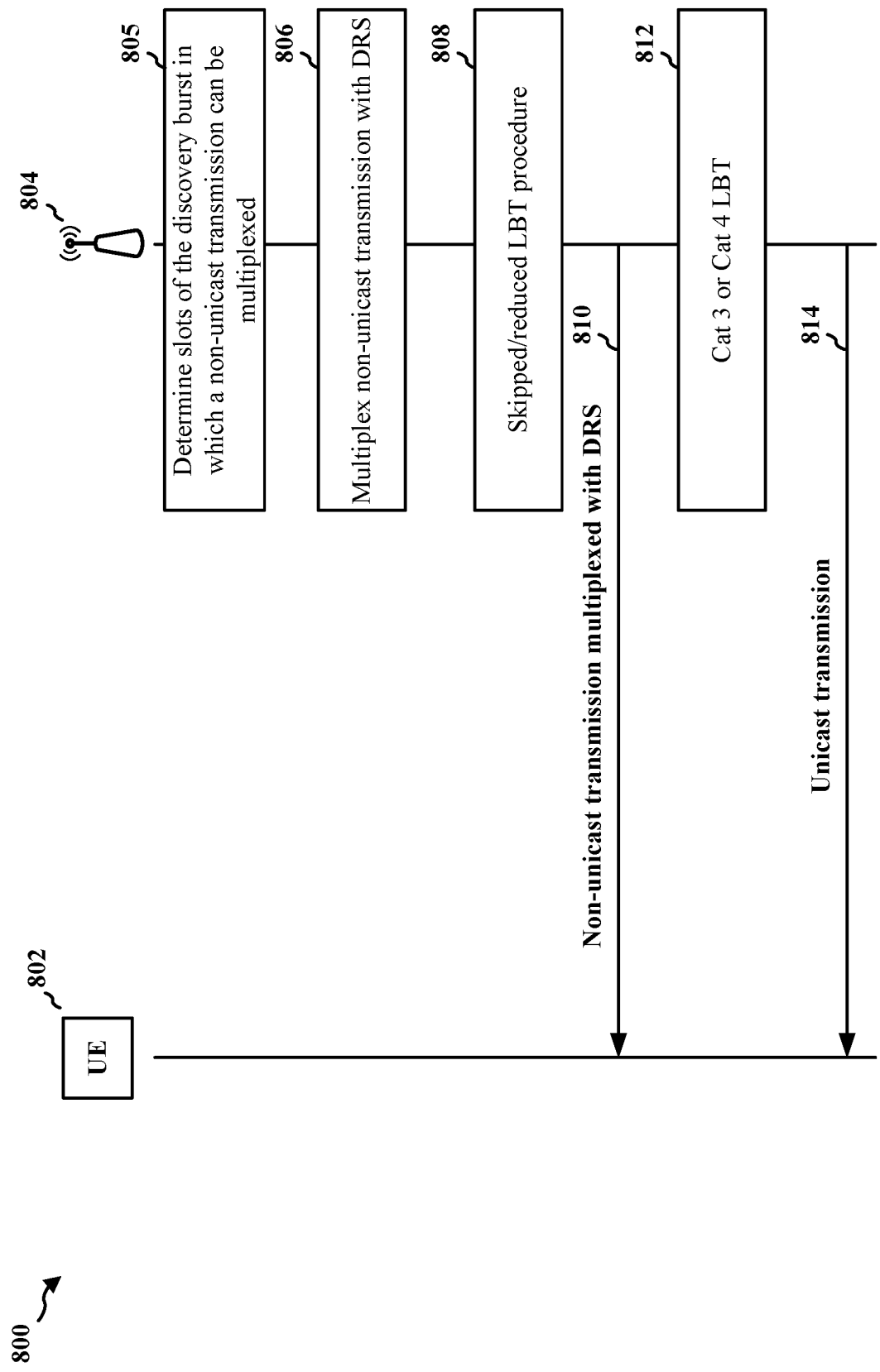
FIG. 8 is a communication flow between a network entity and a UE, including the multiplexing of a non-unicast transmission in a discovery burst, in accordance with various aspects of the present disclosure.

FIG. 8 illustrates a communication flow 800 between a UE 802 and a base station 804. Although the example aspects are described for a base station 804, the aspects may similarly be performed by a network entity that is either a base station in aggregated form or one or more components of a disaggregated base station, an IAB node, a relay node, a CU, a DU, a RU, a Near-RT RIC, or a Non-RT RIC in a disaggregated base station architecture, etc. At 805, the base station 804 may determine the slots of the discovery burst in which the base station can multiplex a non-unicast transmission with the DRS. For example, the base station may determine that the non-unicast transmission may be multiplexed based on a distance from a slot including DRS in the discovery burst, e.g. after a last slot including one or more DRS or before a first slot including the one or more DRS in the discovery burst. The distance may correspond to zero in some examples, so that the non-unicast transmission is only multiplexed in a slot that also include one or more DRS, such as described in connection with 525 and 550 of FIG. 5. In other examples, the distance may allow for the non-unicast transmission to be multiplexed within a distance of one or more slots from a slot containing DRS in the DRS burst, such as described in connection with 625 and 650 in FIG. 6. In some aspects, the base station may determine that the non-unicast transmission may be multiplexed within symbols of the DRS burst that are between symbols (e.g., a first symbol and a last symbol) of the DRS burst that include an SSB, such as described in connection with 725. In some aspects, the base station may determine that the non-unicast transmission may be multiplexed within symbols of the DRS burst that are between symbols (e.g., a first symbol and a last symbol) of the DRS burst that include a DRS, such as described in connection with 750. At 806, the base station 804 multiplexes a non-unicast transmission with a DRS and within a discovery burst. The multiplexing may be based on any of the aspects described in connection with 525, 550, 625, or 650 in FIGS. 5 and 6. At 808, the base station uses LBT relaxation, such as skipping LBT or performing a reduced LBT such as Cat 2 LBT, before transmitting the multiplexed transmission on a shared spectrum at 810. For non-DRS transmissions, such as a unicast transmission 814, the base station 804 successfully performs an LBT, or a longer LBT such as a Cat 3 or Cat 4 LBT procedure 812, before transmitting the unicast transmission 814 on the shared spectrum. The shared spectrum may be in the FR2-2 frequency range, in some aspects.

Figure 9:
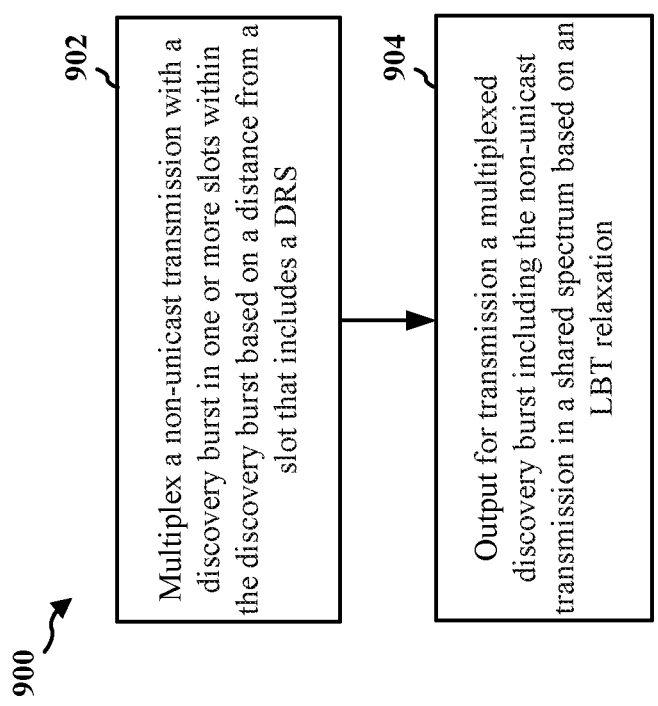
FIG. 9 is a flowchart of a method of wireless communication, in accordance with various aspects of the present disclosure.

FIG. 9 is a flowchart 900 of a method of wireless communication. The method may be performed by a network entity such as a base station or a component of a base station (e.g., the base station 102/180, 310, 804; the apparatus 1002). The network entity or network node may be implemented as a base station (i.e., an aggregated base station), as a disaggregated base station, an IAB node, a relay node, a CU, a DU, a RU, a Near-RT RIC, or a Non-RT RIC in a disaggregated base station architecture, etc. The method may provide for improved fairness in wireless communication in a shared spectrum.

At 902, the network entity multiplexes a non-unicast transmission with a discovery burst in one or more slots within the discovery burst based on a distance from a slot that includes a DRS. For example, the distance may be a distance from a last slot of a segment of slots that include the DRS, such as described in connection with FIG. 5 or 6. Before the multiplexing, the network entity may determine in which slots of the discovery burst the non-unicast transmission may be multiplexed, such as described in connection with 805 in FIG. 8. The transmission may be in a shared spectrum operation within a frequency range 2-2 (FR2-2) frequency band. The discovery burst may be based on a duty cycle limitation for the DRS. The DRS may include one or more of SSB, RMSI PDCCH, RMSI PDSCH, and/or NZP-CSI-RS. The non-unicast transmission may include one or more of a broadcast PDSCH, a PDSCH without user-plane data, a PDCCH, or a PRS. The multiplexing may be performed, e.g., by the multiplex component 1040 in FIG. 10.

In some aspects, the non-unicast transmission may be multiplexed with the DRS in the one or more slots of the discovery burst that include an SSB. For example, the distance may correspond to zero slot lengths and the non-unicast transmission may not be multiplexed in slots of the discovery burst that do not include the SSB, such as shown at 525 in FIG. 5. In some aspects, the distance may correspond to one or more slot lengths and the non-unicast transmission may be multiplexed with the DRS in the one or more slots that are within the distance from the slot, including the SSB and not in slots of the discovery burst that is more than the distance from the slot that includes the SSB, e.g., as shown at 625 in FIG. 6.

In some aspects, the non-unicast transmission may be multiplexed with the DRS in the one or more slots that include at least one of an SSB, an RMSI PDCCH, an RMSI PDSCH, or an NZP-CSI-RS. The distance may correspond to zero slot lengths and the non-unicast transmission may not be multiplexed in slots of the discovery burst that does not include the SSB, the RMSI PDCCH, the RMSI PDSCH, or the NZP-CSI-RS, e.g., as shown at 550 in FIG. 5. In some aspects, the distance may correspond to one or more slot lengths and the non-unicast transmission may be multiplexed with the DRS in the one or more slots that are within the distance from the slot including the SSB, the RMSI PDCCH, the RMSI PDSCH, or the NZP-CSI-RS and not in slots of the discovery burst that is more than the distance from the slot including the SSB, the RMSI PDCCH, the RMSI PDSCH, or the NZP-CSI-RS, e.g., as shown at 650 in FIG. 6.

In some aspects, the non-unicast transmission may be multiplexed with the DRS in the one or more slots of the discovery burst that are between a first slot including an SSB and a last slot including the SSB. The non-unicast transmission may not be multiplexed in slots of the discovery burst after the last slot including the SSB. For example, the non-unicast transmission may be multiplexed in slots between the slots of the DRS burst including an SSB, such as shown at 725.

In some aspects, the non-unicast transmission may be multiplexed with the DRS in the one or more slots of the discovery burst that are between a first slot including at least one of an SSB, an RMSI PDCCH, an RMSI PDSCH, or an NZP-CSI-RS and a last slot including the SSB, the RMSI PDCCH, the RMSI PDSCH, or the NZP-CSI-RS. The non-unicast transmission may not be multiplexed in slots of the discovery burst after the last slot including the SSB, the RMSI PDCCH, the RMSI PDSCH, or the NZP-CSI-RS. For example, the non-unicast transmission may be multiplexed in slots between the slots of the DRS burst including an SSB, such as shown at 725.

At 904, the network entity outputs for transmission, or transmits, a multiplexed discovery burst including the non-unicast transmission in a shared spectrum based on an LBT relaxation. The LBT relaxation may include at least one of: skipping an LBT procedure before outputting the multiplexed discovery burst in the shared spectrum, or performing a category 2 (Cat 2) LBT procedure in place of a category 4 (Cat 4) LBT procedure or category 3 (Cat 3) LBT procedure before outputting the multiplexed discovery burst in the shared spectrum. FIG. 8 illustrates an example of a network entity transmitting a multiplexed transmission, e.g., 810, based on a relaxed LBT procedure at 808. The output for transmission may be performed, e.g., by the discovery burst component 1042 of the apparatus 1002 in FIG. 10.

Figure 10:
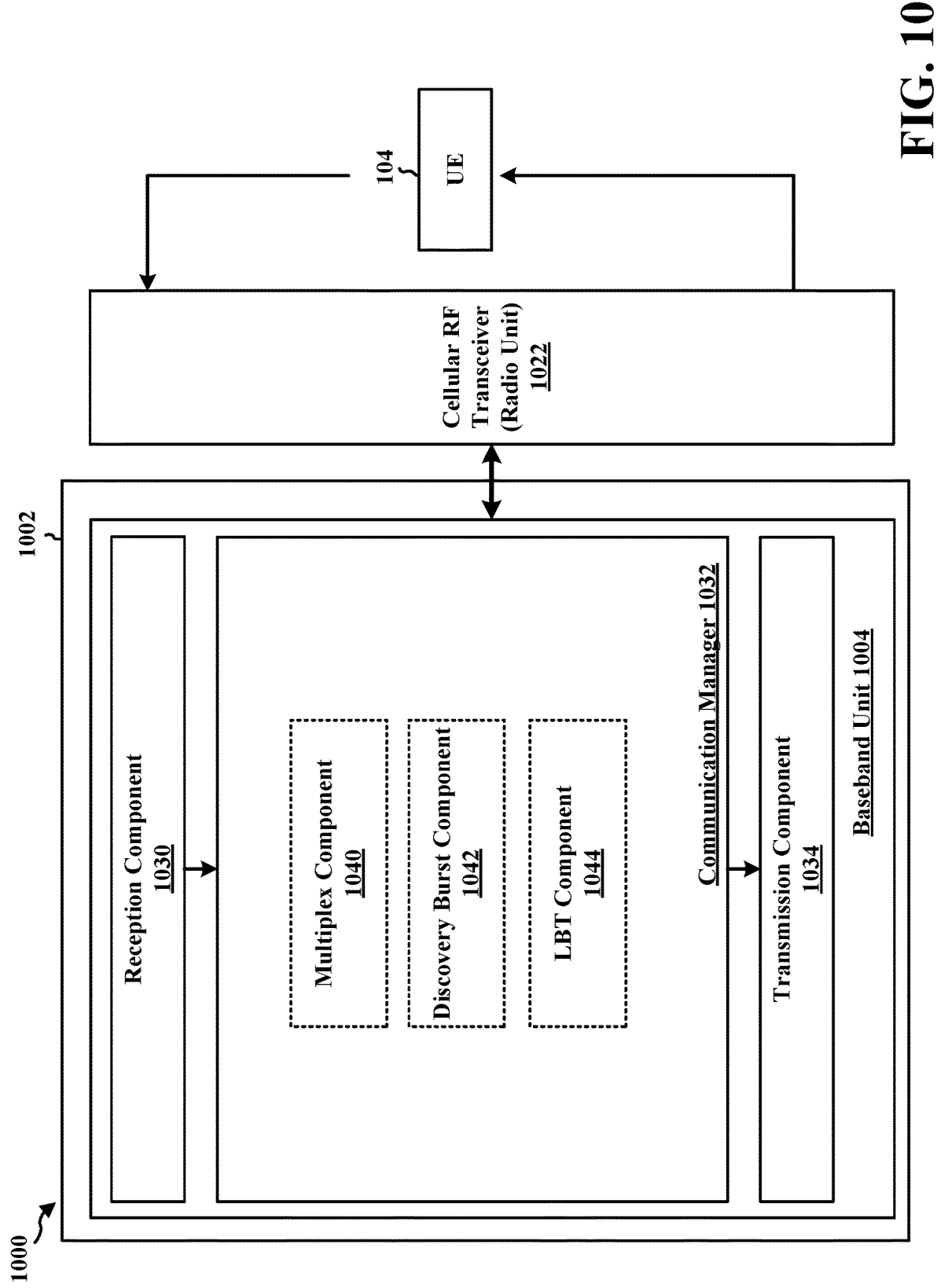
FIG. 10 is a diagram illustrating an example of a hardware implementation for an example apparatus, in accordance with various aspects of the present disclosure.

FIG. 10 is a diagram 1000 illustrating an example of a hardware implementation for an apparatus 1002 of a network entity or network node. The apparatus 1002 may be a base station, a component of a base station, or may implement base station functionality. The apparatus 1002 may include functionality of one or more of a CU, a DU, and/or an RU. In some aspects, the apparatus 1002 may include a baseband unit 1004. The baseband unit 1004 may communicate with a cellular RF transceiver 1022 at an RU in order to communicate with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030 for processing received communication, a communication manager 1032, and a transmission component 1034 for processing communication for transmission. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes a multiplex component 1040 that is configured to multiplex a non-unicast transmission with a discovery burst in one or more slots within the discovery burst based on a distance from a slot that includes a DRS, e.g., as described in connection with 902 in FIG. 9. The communication manager 1032 further includes a discovery burst component 1042 that is configured to output for transmission a multiplexed discovery burst including the non-unicast transmission in a shared spectrum based on an LBT relaxation, e.g., as described in connection with 904 in FIG. 9. The communication manager 1032 further includes an LBT component 1044 that is configured to perform a relaxed LBT before transmitting the DRS, e.g., as described in connection with 904 in FIG. 9.

The apparatus may include additional components that perform each of the blocks of the algorithm in the flowchart of FIG. 9 and/or the aspects performed by the base station in FIG. 8. As such, each block in the flowchart of FIG. 9 and/or the aspects performed by the base station in FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular, the baseband unit 1004, includes means for multiplexing a non-unicast transmission with a discovery burst in one or more slots within the discovery burst based on a distance from a slot that includes a DRS; and means for outputting for transmission a multiplexed discovery burst including the non-unicast transmission in a shared spectrum based on an LBT relaxation. The means may be one or more of the components of the apparatus 1002 configured to perform the functions recited by the means. As described supra, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 11:
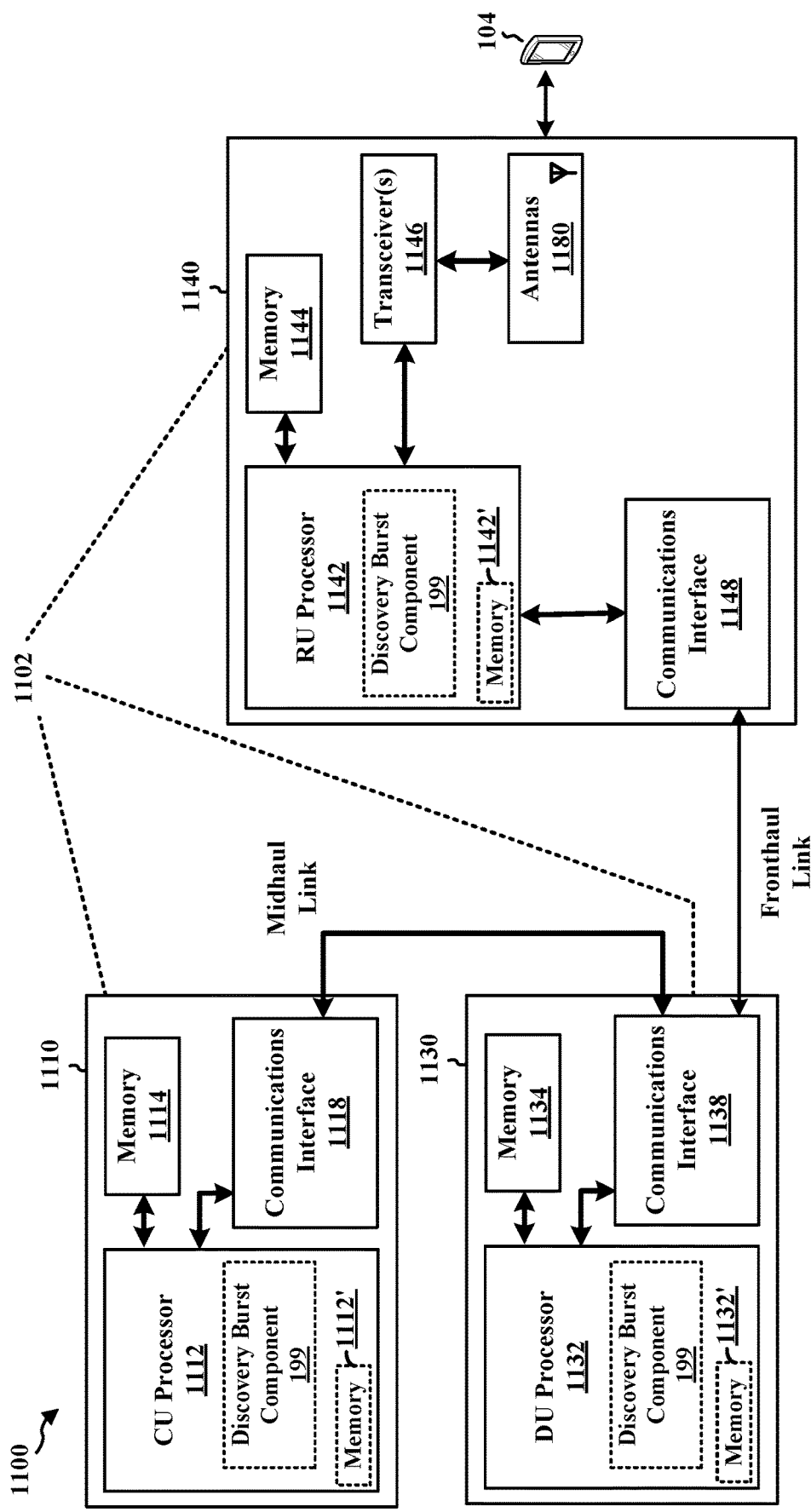
FIG. 11 is a diagram illustrating an example of a hardware implementation for an example apparatus or network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the discovery burst component 199 is configured to multiplex a non-unicast transmission with a discovery burst in one or more slots within the discovery burst based on a distance from a slot that includes a DRS and output for transmission a multiplexed discovery burst including the non-unicast transmission in a shared spectrum based on an LBT relaxation. The discovery burst component 199 may be further configured to perform a relaxed LBT before transmitting the DRS. The discovery burst component 199 may be configured to perform each of the blocks of the algorithm in the flowchart of FIG. 9 and/or the aspects performed by the base station in FIG. 8. The component 199 may be within one or more processors of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 includes means for multiplexing a non-unicast transmission with a discovery burst in one or more slots within the discovery burst based on a distance from a slot that includes a DRS and means for outputting for transmission a multiplexed discovery burst including the non-unicast transmission in a shared spectrum based on an LBT relaxation. The network entity may further include means for performing a relaxed LBT before transmitting the DRS. The network entity may further include means for performing each of the blocks of the algorithm in the flowchart of FIG. 9 and/or the aspects performed by the base station in FIG. 8. The means may be the component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity, comprising: multiplexing a non-unicast transmission with a discovery burst in one or more slots within the discovery burst based on a distance from a slot that includes a DRS; and outputting for transmission a multiplexed discovery burst including the non-unicast transmission in a shared spectrum based on an LBT relaxation.

In aspect 2, the method of aspect 1 further includes that the non-unicast transmission is multiplexed with the DRS in the one or more slots of the discovery burst that include an SSB.

In aspect 3, the method of aspect 2 further includes that the distance corresponds to zero slot lengths and the non-unicast transmission is not multiplexed in slots of the discovery burst that do not include the SSB.

In aspect 4, the method of aspect 2 further includes that the distance corresponds to one or more slot lengths and the non-unicast transmission is multiplexed with the DRS in the one or more slots that are within the distance from the slot including the SSB.

In aspect 5, the method of aspect 2 or 4 further includes that the non-unicast transmission is not multiplexed in slots of the discovery burst that are more than the distance from the slot that includes the SSB.

In aspect 6, the method of aspect 1 further includes that the non-unicast transmission is multiplexed with the DRS in the one or more slots that include at least one of an SSB, an RMSI PDCCH, an RMSI PDSCH, or an NZP-CSI-RS.

In aspect 7, the method of aspect 6 further includes that the distance corresponds to zero slot lengths and the non-unicast transmission is not multiplexed in slots of the discovery burst that do not include the SSB, the RMSI PDCCH, the RMSI PDSCH, or the NZP-CSI-RS.

In aspect 8, the method of aspect 6 further includes that the distance corresponds to one or more slot lengths and the non-unicast transmission is multiplexed with the DRS in the one or more slots that are within the distance from the slot including the SSB, the RMSI PDCCH, the RMSI PDSCH, or the NZP-CSI-RS.

In aspect 9, the method of aspect 6 or 8 further includes that the non-unicast transmission is not multiplexed in slots of the discovery burst that are more than the distance from the slot including the SSB, the RMSI PDCCH, the RMSI PDSCH, or the NZP-CSI-RS.

In aspect 10, the method of aspect 1 further includes that the non-unicast transmission is multiplexed with the DRS in the one or more slots of the discovery burst that are between a first slot including an SSB and a last slot including the SSB.

In aspect 11, the method of aspect 10 further includes that the non-unicast transmission is not multiplexed in slots of the discovery burst after the last slot including the SSB.

In aspect 12, the method of aspect 1 further includes that the non-unicast transmission is multiplexed with the DRS in the one or more slots of the discovery burst that are between a first slot including at least one of an SSB, a RMSI PDCCH, an RMSI PDSCH, or an NZP-CSI-RS and a last slot including the at least one of the SSB, the RMSI PDCCH, the RMSI PDSCH, or the NZP-CSI-RS.

In aspect 13, the method of aspect 12 further includes that the non-unicast transmission is not multiplexed in slots of the discovery burst after the last slot including the at least one of the SSB, the RMSI PDCCH, the RMSI PDSCH, or the NZP-CSI-RS.

In aspect 14, the method of any of aspects 1-13 further include that the transmission is in a shared spectrum operation within an FR2-2 frequency band.

In aspect 15, the method of any of aspects 1-14 further includes that the LBT relaxation includes at least one of: skipping an LBT procedure before outputting the multiplexed discovery burst in the shared spectrum, or performing a Cat 2 LBT procedure in place of a Cat 4 LBT procedure or Cat 3 LBT procedure before outputting the multiplexed discovery burst in the shared spectrum.

In aspect 16, the method of any of aspects 1-15 further includes that the discovery burst is based on a duty cycle limitation for the DRS.

In aspect 17, the method of any of aspects 1-16 further includes that the DRS includes one or more of: an SSB, an RMSI PDCCH, an RMSI PDSCH, or an NZP-CSI-RS.

In aspect 18, the method of any of aspects 1-17 further includes that the non-unicast transmission includes one or more of: a broadcast PDSCH, a PDSCH without user-plane data, a PDCCH, or a PRS.

Aspect 19 is an apparatus for wireless communication at a network entity, comprising: at least one processor and at least one memory communicatively coupled with the at least one processor and storing processor-readable code that, when executed by the at least one processor, is configured to cause the network entity to perform the method of any of aspects 1-18.

In aspect 20, the apparatus of aspect 19 further includes a transceiver coupled to the at least one processor.

In aspect 21, the apparatus of aspect 19 or 20 further includes at least one antenna coupled to the at least one processor.

Aspect 22 is an apparatus for wireless communication at a network entity, comprising means to perform the method of any of aspects 1-18.

In aspect 23, the apparatus of aspect 22 further includes a transceiver.

In aspect 24, the apparatus of aspect 22 or 23 further includes at least one antenna.

Aspect 25 is a non-transitory computer-readable medium storing computer executable code, the code when executed by a processor causes the processor to perform the method of any of aspects 1-18.

What is claimed is:

1. A method of wireless communication at a network entity, comprising:
   multiplexing a non-unicast transmission with a discovery burst in one or more slots within the discovery burst based on a distance from a slot that includes a discovery reference signal (DRS), wherein the DRS includes at least one of a synchronization signal block (SSB), a remaining system information (RMSI) physical downlink control channel (PDCCH), an RMSI physical downlink shared channel (PDSCH), or a non-zero power channel state information reference signal (NZP-CSI-RS), and wherein the non-unicast transmission includes one or more of:
   a broadcast PDSCH,
   a non-unicast PDSCH without user-plane data,
   a non-unicast PDCCH, or
   a positioning reference signal (PRS); and
   outputting for transmission a multiplexed discovery burst including the non-unicast transmission in a shared spectrum based on a listen before talk (LBT) relaxation.

2. The method of claim 1, wherein the non-unicast transmission is multiplexed with the DRS in the one or more slots of the discovery burst that include the SSB.

3. The method of claim 2, wherein the distance corresponds to one of:
   zero slot lengths and the non-unicast transmission is not multiplexed in slots of the discovery burst that do not include the SSB, or
   one or more slot lengths and the non-unicast transmission is multiplexed with the DRS in the one or more slots that are within the distance from the slot including the SSB.

4. The method of claim 2, wherein the non-unicast transmission is not multiplexed in slots of the discovery burst that are more than the distance from the slot that includes the SSB.

5. The method of claim 1, wherein the non-unicast transmission is multiplexed with the DRS in the one or more slots that include at least one of the SSB, the RMSI PDCCH, the RMSI PDSCH, or the NZP-CSI-RS.

6. The method of claim 5, wherein the distance corresponds to zero slot lengths and the non-unicast transmission is not multiplexed in slots of the discovery burst that do not include the SSB, the RMSI PDCCH, the RMSI PDSCH, or the NZP-CSI-RS.

7. The method of claim 5, wherein the distance corresponds to one or more slot lengths and the non-unicast transmission is multiplexed with the DRS in the one or more slots that are within the distance from the slot including the SSB, the RMSI PDCCH, the RMSI PDSCH, or the NZP-CSI-RS.

8. The method of claim 5, wherein the non-unicast transmission is not multiplexed in slots of the discovery burst that are more than the distance from the slot including the SSB, the RMSI PDCCH, the RMSI PDSCH, or the NZP-CSI-RS.

9. The method of claim 1, wherein the non-unicast transmission is multiplexed with the DRS in the one or more slots of the discovery burst that are between a first slot including the SSB and a last slot including the SSB, wherein the non-unicast transmission is not multiplexed in slots of the discovery burst after the last slot including the SSB.

10. The method of claim 1, wherein the non-unicast transmission is multiplexed with the DRS in the one or more slots of the discovery burst that are between:
    a first slot including at least one of the SSB, the RMSI PDCCH, the RMSI PDSCH, or the NZP-CSI-RS, and
    a last slot including the at least one of the SSB, the RMSI PDCCH, the RMSI PDSCH, or the NZP-CSI-RS, wherein the non-unicast transmission is not multiplexed in slots of the discovery burst after the last slot including the at least one of the SSB, the RMSI PDCCH, the RMSI PDSCH, or the NZP-CSI-RS.

11. The method of claim 1, wherein the transmission is in a shared spectrum operation within a frequency range 2-2 (FR2-2) frequency band.

12. The method of claim 1, wherein the LBT relaxation includes at least one of:
skipping an LBT procedure before outputting the multiplexed discovery burst in the shared spectrum, or
performing a category 2 (Cat 2) LBT procedure in place of a category 4 (Cat 4) LBT procedure or category 3 (Cat 3) LBT procedure before outputting the multiplexed discovery burst in the shared spectrum.

13. The method of claim 1, wherein the discovery burst is based on a duty cycle limitation for the DRS.

14. The method of claim 1, wherein the DRS includes the SSB, RMSI PDCCH, and the RMSI PDSCH.

15. An apparatus for wireless communication at a network entity, comprising:
memory; and
at least one processor coupled to the memory and configured to:
multiplex a non-unicast transmission with a discovery burst in one or more slots within the discovery burst based on a distance from a slot that includes a discovery reference signal (DRS), wherein the DRS includes at least one of a synchronization signal block (SSB), a remaining system information (RMSI) physical downlink control channel (PDCCH), an RMSI physical downlink shared channel (PDSCH), or a non-zero power channel state information reference signal (NZP-CSI-RS)), and wherein the non-unicast transmission includes one or more of:
a broadcast PDSCH,
a non-unicast PDSCH without user-plane data,
a non-unicast PDCCH, or
a positioning reference signal (PRS); and
output for transmission a multiplexed discovery burst including the non-unicast transmission in a shared spectrum based on a listen before talk (LBT) relaxation.

16. The apparatus of claim 15, wherein the at least one processor is configured to multiplex the non-unicast transmission with the DRS in the one or more slots of the discovery burst that include the SSB.

17. The apparatus of claim 16, wherein the distance corresponds to one of:
zero slot lengths and the non-unicast transmission is not multiplexed in slots of the discovery burst that do not include the SSB, or
one or more slot lengths, and wherein the at least one processor is configured to multiplex the non-unicast transmission with the DRS in the one or more slots that are within the distance from the slot including the SSB.

18. The apparatus of claim 16, wherein the non-unicast transmission is not multiplexed in slots of the discovery burst that are more than the distance from the slot that includes the SSB.

19. The apparatus of claim 15, wherein the at least one processor is configured to multiplex the non-unicast transmission with the DRS in the one or more slots that include at least one of the SSB, the RMSI PDCCH, the RMSI PDSCH, or the NZP-CSI-RS.

20. The apparatus of claim 19, wherein the distance corresponds to zero slot lengths and the non-unicast transmission is not multiplexed in slots of the discovery burst that do not include the SSB, the RMSI PDCCH, the RMSI PDSCH, or the NZP-CSI-RS.

21. The apparatus of claim 19, wherein the distance corresponds to one or more slot lengths, and wherein the at least one processor is configured to multiplex the non-unicast transmission with the DRS in the one or more slots that are within the distance from the slot including the SSB, the RMSI PDCCH, the RMSI PDSCH, or the NZP-CSI-RS.

22. The apparatus of claim 19, wherein the non-unicast transmission is not multiplexed in slots of the discovery burst that are more than the distance from the slot including the SSB, the RMSI PDCCH, the RMSI PDSCH, or the NZP-CSI-RS.

23. The apparatus of claim 15, wherein the non-unicast transmission is multiplexed with the DRS in the one or more slots of the discovery burst that are between a first slot including the SSB and a last slot including the SSB, wherein the non-unicast transmission is not multiplexed in slots of the discovery burst after the last slot including the SSB.

24. The apparatus of claim 15, wherein the non-unicast transmission is multiplexed with the DRS in the one or more slots of the discovery burst that are between:
a first slot including at least one of the SSB, the RMSI PDCCH, the RMSI PDSCH, or the NZP-CSI-RS, and
a last slot including the at least one of the SSB, the RMSI PDCCH, the RMSI PDSCH, or the NZP-CSI-RS,
wherein the non-unicast transmission is not multiplexed in slots of the discovery burst after the last slot including the at least one of the SSB, the RMSI PDCCH, the RMSI PDSCH, or the NZP-CSI-RS.

25. The apparatus of claim 15, wherein the transmission is in a shared spectrum operation within a frequency range 2-2 (FR2-2) frequency band.

26. The apparatus of claim 15, wherein the LBT relaxation includes at least one of:
a skipped LBT procedure before the output of the multiplexed discovery burst in the shared spectrum, or
performance of a category 2 (Cat 2) LBT procedure in place of a category 4 (Cat 4) LBT procedure or category 3 (Cat 3) LBT procedure before the output of the multiplexed discovery burst in the shared spectrum.

27. The apparatus of claim 15, wherein the discovery burst is based on a duty cycle limitation for the DRS.

28. The apparatus of claim 15, further comprising:
at least one transceiver coupled to the at least one processor and configured to transmit the multiplexed discovery burst, wherein the DRS includes the SSB, and the RMSI PDCCH, and the RMSI PDSCH.

29. An apparatus for wireless communication at a network entity, comprising:
means for multiplexing a non-unicast transmission with a discovery burst in one or more slots within the discovery burst based on a distance from a slot that includes a discovery reference signal (DRS), wherein the DRS includes at least one of a synchronization signal block (SSB), a remaining system information (RMSI) physical downlink control channel (PDCCH), an RMSI physical downlink shared channel (PDSCH), or a non-zero power channel state information reference signal (NZP-CSI-RS)), and wherein the non-unicast transmission includes one or more of:
a broadcast PDSCH,
a non-unicast PDSCH without user-plane data,
a non-unicast PDCCH, or
a positioning reference signal (PRS); and means for outputting for transmission a multiplexed discovery burst including the non-unicast transmission in a shared spectrum based on a listen before talk (LBT) relaxation.

30. A non-transitory computer-readable medium storing computer executable code at a network entity, the code when executed by a processor causes the processor to:
multiplex a non-unicast transmission with a discovery burst in one or more slots within the discovery burst based on a distance from a slot that includes a discovery reference signal (DRS), wherein the DRS includes at least one of a synchronization signal block (SSB), a remaining system information (RMSI) physical downlink control channel (PDCCH), an RMSI physical downlink shared channel (PDSCH), or a non-zero power channel state information reference signal (NZP-CSI-RS)), and wherein the non-unicast transmission includes one or more of:
a broadcast PDSCH,
a non-unicast PDSCH without user-plane data,
a non-unicast PDCCH, or
a positioning reference signal (PRS); and
output for transmission a multiplexed discovery burst including the non-unicast transmission in a shared spectrum based on a listen before talk (LBT) relaxation.

* * * * *